United States Patent [19]

Upadhyaya

[11] Patent Number: 4,624,993

[45] Date of Patent: Nov. 25, 1986

[54] METHOD FOR DEPOLYMERIZING POLYMERS

[75] Inventor: Janardan D. Upadhyaya, Fairfield, Conn.

[73] Assignee: Moore and Munger, Inc., Fairfield, Conn.

[21] Appl. No.: 699,658

[22] Filed: Feb. 8, 1985

[51] Int. Cl.$^4$ .................................................. C08F 8/50
[52] U.S. Cl. .................................. 525/388; 525/333.8
[58] Field of Search ................................. 525/333.8, 388

[56] References Cited

U.S. PATENT DOCUMENTS

| | | | |
|---|---|---|---|
| 2,828,296 | 3/1953 | Guillet | 260/93.7 |
| 2,911,384 | 11/1959 | Thompson et al. | 260/28.5 |
| 2,928,797 | 3/1960 | Brunson et al. | 260/23 |
| 3,110,708 | 11/1963 | Wisseroth et al. | 260/93.7 |
| 3,130,186 | 4/1964 | Siggel et al. | 260/93.7 |
| 3,160,621 | 12/1964 | Hagemeyer, Jr. et al. | 260/94.9 |
| 3,177,193 | 4/1965 | Scott, Jr. | 260/94.9 |
| 3,201,381 | 8/1965 | Hagemeyer, Jr. et al. | 260/94.9 |
| 3,227,703 | 1/1966 | Copenhaver, Jr. et al. | 260/94.9 |
| 3,232,917 | 2/1966 | McCall et al. | 260/93.7 |
| 3,383,375 | 5/1968 | van der Vegt et al. | 260/93.7 |
| 3,519,588 | 7/1970 | Hagemeyer, Jr. et al. | 260/29.6 |
| 3,563,972 | 2/1971 | Kowalski | 260/93.7 |
| 3,655,834 | 4/1972 | Wisseroth et al. | 260/94.9 |
| 3,700,639 | 10/1972 | Hulse et al. | 260/88.2 |
| 3,898,209 | 8/1975 | Watson et al. | 260/93.7 |
| 4,145,493 | 3/1979 | Petrille et al. | 526/58 |
| 4,145,526 | 3/1979 | Vanlautem et al. | 528/481 |

OTHER PUBLICATIONS

Asinger, F., *Paraffins, Chemistry and Technology*, 1968, pp. 583–604.

C.A. 20572m "Erosion and Depolymerization of Polymers by Hot Air or Plasma Jets", Dushin et al., Inzh-Fiz.Zh, 1968, 15(3), pp. 444–449.

C.A 32269x "Behavior of Polymer Materials in a Plasma Jet", Yurevich, Teplo., 1969, pp. 145–154.

*Primary Examiner*—Joseph L. Schofer
*Assistant Examiner*—Bernard Lipman
*Attorney, Agent, or Firm*—Maurice M. Klee

[57] ABSTRACT

A method for depolymerizing a non-thermosetting polymer is described. The method comprises the steps of heating the polymer until it is molten and then reacting the molten polymer with oxygen in the absence of a catalyst at a temperature between about 270° F. and about 415° F. by sparging the molten material at a flow rate of at least 2 cubic feet per minute per 1000 pounds of polymer with oxygen-containing gas bubbles having a diameter of less than about 10.0 mm. Advantages of the invention include reduced reaction temperatures, reduced reaction times, elimination of the need for a catalyst, and improved end-products. Treatment of amorphous polypropylene and mixtures of alpha-olefins and Fischer-Tropsch waxes are preferred applications of the invention.

10 Claims, No Drawings

METHOD FOR DEPOLYMERIZING POLYMERS

BACKGROUND OF THE INVENTION

1. Field of the Invention

This invention relates to a method for degrading or depolymerizing non-thermosetting, i.e., meltable, organic polymers. More particularly, the method comprises the thermal oxidative degradation of molten polymers by sparging them with small, oxygen-containing, gas bubbles of a particular size in the absence of a catalyst. The method is particularly useful for the treatment of amorphous polypropylene, homopolymers and copolymers of olefins, and synthetic waxes prepared by the Fischer-Tropsch process.

2. Description of the Prior Art

By way of background, organic polymeric chemicals provide an exceptionally complicated variety of chemical and stereochemical configurations. The chemical literature is replete with references concerning the production of such polymers and their treatment in order to alter their diverse physical and chemical properties for various industrial purposes. The polymerization reaction of simple alkene and conjugated dienes produces many useful substances of commerce. Numerous examples of polymerization exist, such as, the treatment of ethylene in the presence of oxygen, heat, pressure and catalysts to produce polyethylene, the polymerization of vinyl chloride to polyvinyl chloride, etc. Some of these polymerizations can be designed to produce stereospecific polymers. Polypropylene, for example, can exist in a high melting crystalline form, a soft and rubbery amorphous form, and in various forms intermediate between these extremes.

Various physical and chemical treatments have been applied to polymers in order to effect conformational and chemical changes resulting in changes in measureable properties of the polymer (e.g., molecular weight, melting point, viscosity, acid number, etc.). Although polymers can be reacted with acids and other chemicals, they are commonly subjected to oxidation and/or elevated temperature treatments to produce various degradative effects. Commonly, thermal/oxidation treatments are facilitated by catalysts and increased pressure.

Among the various olefin polymers, the oxidation of paraffin wax has been extensively studied and provides a representative paradigm. The paraffin wax starting material can be produced from natural sources (petroleum or lignite) or can be produced synthetically (Fischer-Tropsch process). The oxidation of these waxes either by means of chemicals or through the use of air or other oxygen-containing atmospheres results in the formation of water-soluble fatty acids which have been used for the manufacture of soaps and various fatty acid esters. The oxidations also commonly produce undesirable degradation by-products having dark colors and/or unpleasant smells.

Various researchers during the past century have identified the importance of various factors affecting the oxidation of paraffin wax. See, for example, Asinger, F., *Paraffins, Chemistry and Technology*, 1968, pages 583-604. Temperature, catalysts, pressure, and air or oxygen distribution have been found to be some of the significant variables.

For example, by using low reaction temperatures and short reaction times it has been found that the quality of the final product can generally be improved by reducing undesirable by-products (e.g., dark oxidates, alcohols, ketones, aldehydes, esters, lactones, peroxides, low molecular weight fatty acids, etc.). A low reaction temperature obviates over-oxidized substances and keeps a good product color. However, it also markedly extends the reaction time and attenuates the utilization of atmospheric oxygen.

To reduce reaction times, catalysts, increased temperatures, and, in some cases, increased pressures resulting in increased amounts of dissolved oxygen, have been used. Significantly, however, with regard to the present invention, it has been generally observed that from a commercial point of view, the oxidation process is unacceptably long even at elevated temperatures and pressures without the aid of catalysts.

Various patents have addressed the problem of degrading or depolymerizing polymers. For example, the thermal degradation or thermal oxidative degradation of polyolefins is described in U.S. Pat. Nos. 3,110,708, 3,519,588, and 3,898,209, including references to pressure, molten preparations, catalysts, and solvents. U.S. Pat. No. 3,700,639 describes the thermal degradation in air of highly crystalline copolymers of styrene and alpha-olefins. The thermal oxidative degradation of solid and molten polyethylene is described in U.S. Pat. Nos. 2,928,797, 3,177,193, 3,201,381, and 3,655,834. The thermal oxidative treatment of polypropylene is presented in U.S. Pat. Nos. 2,911,384, 3,110,708, 3,130,186, 3,563,972, 3,383,375, and 3,898,209, including use, in part, of solvents, catalysts, and increased pressure to produce products of lower molecular weight than the starting materials.

The use of air streams or other oxygen-containing atmospheres in connection with the thermal degradation of polymers is described in a number of patents. For example, U.S. Pat. No. 4,145,526 describes the use of a stream of gas to fluidize a bed of polymer particles composed of hydroxycarboxylic homopolymers or copolymers. U.S. Pat. No. 3,227,703 describes the use of an air stream during a process of thermally degrading odorous solid polyolefins (i.e. granular polyethylene). The use of oxygen/air bubbles or air sparging in connection with the oxidation of particular polymers is discussed in U.S. Pat. Nos. 2,828,296, 3,160,621, 3,232,917, and 4,145,493. In direct contrast to the present invention, the teaching of these prior art references is that the use of oxygen/air bubbles or sparging alone results in slow reaction times.

SUMMARY OF THE INVENTION

In light of the foregoing discussions of the diverse prior art methods for the degradation of polymers, particularly the thermal oxidative degradation of polymers, an improved, simple, and straightforward method for such depolymerization is plainly desirable.

Accordingly, an object of this invention is to provide a new, useful, simple, and inexpensive method for the thermal oxidative decomposition or depolymerization of polymers. A further, more particular, object of the invention is to provide a method for decreasing the viscosity and softening point or amorphous polypropylene. Yet another object is to provide a method for the oxidative decomposition of polyolefins, alpha-olefins, Fischer-Tropsch waxes, and mixtures thereof.

An additional object is to provide a method for the oxidative decomposition of polymers which operates at low temperatures, does not use a catalyst, and has a fast reaction rate.

In accordance with the invention, it has now been discovered that organic polymers can be depolymerized rapidly at low temperatures without the aid of a catalyst by carefully regulating the flow rate and bubble size of an oxygen-containing atmosphere which is sparged through the polymer while the polymer is in its molten state.

Specifically, the method of the invention comprises reacting molten polymers at atmospheric pressure in the absence of catalysts at a temperature between about 270° F. (130° C.) and about 415° F. (215° C.) while sparging the molten material with an oxygen-containing gas at a flow rate of at least 2 cubic feet per minute (c.f.m.) per 1000 pounds of reactor charge, and preferably between 2 and about 20 c.f.m./1000 lbs. of reactor charge, where the gas bubble size (diameter) is less than about 10.0 mm, and is preferably between about 0.5 mm and about 5.0 mm. Optionally, the molten material is constantly stirred as it is sparged. It is preferred to use air as the oxygen-containing gas, but pure oxygen gas or mixtures of oxygen and inert gases (e.g., nitrogen) can be substituted for air, if desired.

The maximum bubble size of about 10.0 mm and the minimum flow rate of 2 c.f.m./1000 lbs. of reactant are critical to the success of the process. If larger bubbles or smaller flow rates are used, the reaction is found to run at a rate which is too slow to be commercially acceptable. It is believed that the widespread use of catalysts in depolymerization reactions is a result of the failure of prior art workers to recognize the criticality of these two parameters.

The particular temperature at which the reaction is run depends upon the material being depolymerized and the desired end-product. In all cases, the temperature must be higher than the melting point of the starting material. Preferably, to avoid the production of undesirable by-products, the reaction is run at between about 25° F. and 50° F. above the melting point of the starting material. For example, reaction temperatures around 395° F. (385°–405° F.) have been found to result in successful depolymerizations of amorphous polypropylene having a melting point around 360° F., while for alpha-olefins and Fischer-Tropsch waxes, which melt in the range of 175° F. to 225° F., reaction temperatures on the order of 200° F. to 275° F. are used. Similar temperature ranges can be readily determined for other polymers by persons skilled in the art.

It is convenient to monitor the reaction by periodically removing samples from the reaction vessel and assaying them for softening point, viscosity, acid number, saponification number or a similar parameter. Once the desired end-product has been produced, the reaction is stopped most conveniently by removing the material from the reaction vessel while continuing to sparge the material so as to prevent the molten polymer from backing up into the sparging apparatus. Prior to removal from the vessel, it is advisable to add 0.2% (w/w) of an oxidation inhibitor, e.g., IRGANOX 1010 (Geigy Chemical Corporation, Ardsley, N.Y. 10502) BHT, or the like, to the finished product to prevent further degradation during storage and use.

In contrast to conventional commercial techniques for trying to effect depolymerization, the present invention uses lower temperatures, shorter reaction times, and completely avoids the use of costly catalysts which required removal or deactivation in the prior art techniques. Indeed, catalysts cannot be used in connection with the present invention since they result in uncontrollably high reaction rates. In view of the reduced reaction time and the removal of catalyst, the present method is less costly than conventional methods. Moreover, the products produced by the method of the present invention have superior properties, e.g., better color and odor, than products produced by prior art techniques.

The foregoing and other advantages and objects are described below in connection with the description of the preferred embodiments of the invention.

DESCRIPTION OF THE PREFERRED EMBODIMENTS

As described above, the present invention relates to a method for depolymerizing polymers without the use of catalysts by melting the polymer and then sparging the molten material at a carefully controlled rate with an oxygen-containing gas which has been broken up into bubbles of a carefully controlled size.

By means of the invention, high molecular weight polymers, including polyolefins (polymers of ethylene, propylene and higher olefins) are converted to lower molecular weight compounds by oxidation with air. Materials which can be depolymerized include: alpha-olefin, fully refined paraffin (F.R.P.), petrolatum, amorphous polymers and co-polymers, such as, amorphous polypropylene, amorphous polyethylene, amorphous ethylene-vinyl acetate (EVA), Fischer-Tropsch waxes, and mixtures of these materials. More generally, the method of the present invention can be used to degrade any polymer which is non-thermosetting, i.e., any polymer which can be melted and maintained in a molten condition.

For the process to work, the bubble size of the oxygen-containing gas must be kept below about 10.0 mm and the flow rate of the gas must be kept above 2 c.f.m./1000 lbs. of reactant. A flow rate of this magnitude can be achieved using conventional apparatus for handling pressurized gases. The bubble size can be achieved by dispersing the pressurized gas through a metal mesh work, or more simply and preferably, by dispersing it from a slit cut along the length of an elongated tube which is placed along the bottom of the reaction vessel.

Since the reaction is preferably carried out at atmospheric pressure, special pressurized vessels and the like are not required. Rather, all that is required is a conventional heated reaction vessel having an inner surface which will not react with the polymer being depolymerized. Similarly, conventional stirring equipment can be used when it is desired to stir the molten polymer during the reaction. In running the reaction, it has been found preferable to place some previously depolymerized material in the reactor at the beginning of the reaction, i.e., to charge the reactor with a "heel" of previously depolymerized material.

A preferred application of the invention involves the depolymerization of amorphous (non-crystalline) polypropylene. As is well known in the art, crystalline polypropylene is a thermoplastic material which can be prepared by polymerization of propylene with the aid of catalysts. This polymar is important commercially because of its good mechanical properties, workability, and relatively high melting point.

Amorphous polypropylene is a by-product resulting from the production of crystalline polypropylene. Its physical properties, including viscosity and softening point, vary considerably from batch to batch, and, as produced, it generally has little or no commercial value. However, by reducing its viscosity and softening point, amorphous polypropylene can be made suitable for various industrial purposes, including being used as a filler (flooding material) for communication (telephone) cables and the like.

In the past, the viscosity and softening point of amorphous polypropylene have been reduced by heat treatment in the presence of peroxide catalysts. Various organic peroxide catalysts, including ditertiary butyl peroxide, benzoyl peroxide, etc., have been used. Stabilizing agents (e.g., sodium or potassium carbonates) have also been employed. Even with the use of peroxide catalysts, conventional oxidative degradation of amorphous polypropylene has required the use of high temperatures above the melting point of the starting material (e.g., 430° F.) for extended periods of time (e.g., approximately 10 to 20 hours). Also, the use of peroxide catalysts has represented an added expense, and, in addition, deactivation of the catalyst after completion of the degradation has been required.

More specifically, conventional thermal oxidative degradation of amorphous polypropylene has involved the following five steps: (i) holding the starting material at approximately 430° F. until the softening point (Ring and Ball) is approximately 275° F. or below; (ii) cooling the reaction to approximately 375° F.; (iii) adding peroxide catalyst in 0.1% (w/w) increments until the viscosity at 347° F. is 250 centipoise (cps) or below and the softening point is approximately 267° F. or below; (iv) heating the reactants to approximately 400°–410° F. to deactivate the peroxide; and (v) adding 10% (w/w) amorphous polyethylene and 0.2% (w/w) oxidation inhibitor. The reaction time for this conventional process has been approximately 15–16 hours.

The method of the present invention results in significant improvements over the conventional process. Specifically, it allows the oxidative decomposition of amorphous polypropylene to occur at a lower temperature, it eliminates the need for peroxide catalysts, and it decreases the overall reaction time to as much as one-eighth of the time required for the conventional depolymerization.

In accordance with the invention, thermal oxidative degradation of amorphous polypropylene is preferably performed by: (i) holding the starting material at approximately 385°–405° F., i.e., at a lower temperature than the conventional process; (ii) stirring the material at approximately 65–70 rpm using a LIGHTNIN mixer while sparging the molten reactant mixture with fine air bubbles having a diameter less than about 5 mm at a rate of approximately 4–8 c.f.m./1000 lbs. of reactor charge; (iii) stopping the sparging when the viscosity of the reactant mixture at 347° F. is approximately 250 cps and the softening point is approximately 267° F. or below; and (iv) adding 10% (w/w) amorphous polyethylene and 0.2% (w/w) of oxidation inhibitor. The total reaction time for this process is approximately 2 to 5 hours.

As this comparison shows, the process of the present invention is simpler and more straightforward than the prior art process. Moreover, following the inventive procedure has been found to result in improved products compared to products produced by the conventional procedure. Specifically, because of the lower temperatures used and the shorter reaction time, the products of the present invention have a lighter color and less odor than prior art products.

Without intending to limit it in any way, the present invention will be further illustrated by the following examples.

EXAMPLE 1

Thermal Oxidative Degradation of Amorphous Polypropylene: Comparison of the Conventional Method with the Method of the Invention Amorphous polypropylene was depolymerized in accordance with conventional methodology as follows. One thousand (1000) grams of amorphous polypropylene was heated in a glass reactor for 5 hours at 430° F. The material was cooled to 375° F. and 0.4% (w/w) peroxide (benzoyl peroxide) was added in 0.1% increments. The material was then held at 375° F. for an additional 9 hours. The peroxide was then deactivated by raising the temperature of the reactor to approximately 400°–410° F. Ten percent (10%) amorphous polyethylene (w/w) and 0.2% (w/w) of an oxidation inhibitor (IRGANOX 1010) were then added. The viscosity (at 347° F.) and softening point (Ring and Ball) of the end product were then measured, and the color of the product was determined by visual examination.

Using the method of the invention, 1000 grams of amorphous polypropylene were heated in a glass reactor for 4.5 hours at a constant temperature of 385° F. with continuous stirring at 65-70 r.p.m. using a standard laboratory stirrer. The material was continuously sparged with fine air bubbles (about 1 mm in diameter) at a rate of 0.5 liters per minute. At the end of the reaction period, 10% (w/w) amorphous polyethylene and 0.2% (w/w) oxidation inhibitor (IRGANOX 1010) were added. The viscosity (at 347° F.) and softening point (Ring and Ball) were then measured, and the color of the product was determined by visual examination.

The results of the above-described experiments are presented in Table I. As can be seen from this table, both processes produced similar percentage reductions in viscosity. With regard to softening point, however, the conventional method only resulted in a 1.3% reduction, whereas the method of the invention decreased this value by 12.7%. The product produced by the process of the present invention was elastic and light-colored; the product produced by the conventional process had a similar elasticity, but was significantly darker in color and had an unpleasant odor.

Although the viscosity reductions achieved by the two processes were comparable, the process of the present invention resulted in a strikingly greater decrease in softening point. Moreover, without the use of any catalyst, the maximum reaction temperature was reduced by 10.5% and the reaction time was reduced by more than 67%.

EXAMPLE 2

Thermal Oxidative Degradation of Amorphous Polypropylene Having a High Initial Viscosity This example illustrates the use of the inventive process to depolymerize amorphous polypropylene having a high initial viscosity.

Five hundred (500) grams of amorphous polypropylene having a viscosity at 347° F. of 705 cps and a softening point (Ring and Ball) of 302° F. were heated for 90 minutes at a temperature of approximately 405° F. The molten material was continuously sparged with fine air bubbles (about 1 mm in diameter) at a rate of 0.2 liters per minute.

The final product was very tacky and pliable, with a very light color. It had a viscosity at 347° F. of 302 cps and a softening point (Ring and Ball) of 277° F.

EXAMPLE 3

Thermal Oxidative Degradation of an Alpha-Olefin/Fischer-Tropsch Wax Blend

One thousand (1000) grams of a 63/37% (w/w) blend of a $C_{30+}$ alpha-olefin (70–75% $C_{30+}$; 25–30% $C_{24-28}$) and a Fischer-Tropsch wax (PARAFLINT H-2, Moore and Munger, Fairfield, CT 06430) was heated in a glass reactor for 6.5 hours. The reaction was initially held at a temperature of approximately 160°–175° C. for 1.5 hours and then lowered 150° C. for the remainder of the experiment. Throughout the experiment, the molten mixture was sparged with fine air bubbles (about 1 mm in diameter) at a rate of 0.2 liters per minute. The final product had good emulsifying properties, a high acid number (30), and a light color.

Although specific embodiments of the invention have been described and illustrated, it is to be understood that modifications can be made without departing from the invention's spirit and scope. For example, although use of the invention to depolymerize amorphous polypropylene and a blend of an alpha-olefin polymer with a Fischer-Tropsch was has been illustrated, the invention is equally applicable to other types of non-thermosetting polymers.

TABLE I

Results of experiments comparing conventional thermal oxidative degradation of amorphous polypropylene with the method of the invention

|  | Conventional Oxidation Method | Invention Method |
|---|---|---|
| Viscosity (cps) | | |
| Initial | 500 | 460 |
| Final | 147 | 138 |
| Max. Reaction Temp. (°F.) | 430 | 385 |
| Reaction Time (hrs) | 14 | 4.5 |
| Softening Point (°F.) | | |
| Initial | 304 | 306 |
| Final | 300 | 267 |

TABLE I-continued

Results of experiments comparing conventional thermal oxidative degradation of amorphous polypropylene with the method of the invention

|  | Conventional Oxidation Method | Invention Method |
|---|---|---|
| Peroxide Catalyst | + | − |
| Air Sparging | − | + |

What is claimed is:

1. A method for depolymerizing a meltable, organic polymer wherein said polymer is selected from the group consisting of polyolefins, Fischer-Tropsch waxes, petroleum waxes, and mixtures thereof, comprising the steps of heating the polymer until it is molten and then reacting the molten polymer with oxygen in the absence of a catalyst at a temperature between about 270° F. and about 415° F. by sparging the molten material at a flow rate of at least 2 cubic feet per minute per 1000 pounds of polymer with oxygen-containing gas bubbles having a diameter of less than about 10.0 mm.

2. The method of claim 1 wherein the diameter of the gas bubbles is between about 0.5 mm and about 5.0 mm.

3. The method of claim 1 wherein the flow rate is between 2 and about 20 cubic feet per minute per 1000 pounds of polymer.

4. The method of claim 1 wherein the reaction between the molten polymer and oxygen is conducted at atmospheric pressure.

5. The method of claim 1 wherein the reaction is run at a temperature between about 25° F. and about 50° F. above the melting point of the polymer being depolymerized.

6. The method of claim 1 wherein the oxygen-containing gas is air.

7. The method of claim 1 including the additional step of stirring the molten polymer while it is being sparged.

8. The method of claim 1 wherein the polymer is amorphous polypropylene, the reaction is conducted at a temperature between about 385° F. and about 405° F., the oxygen-containing gas is air, and the depolymerized polymer has a viscosity at 347° F. of between about 100 and 250 centipoise and a softening point of below 267° F.

9. The method of claim 1 wherein the polymer is a mixture of a polyolefin prepared from an alpha-olefin and a Fischer-Tropsch wax, the reaction is conducted at a temperature below about 347° F., and the oxygen-containing gas is air.

10. The method of claim 9 wherein the alpha-olefin is $C_{30+}$ alpha-olefin.

* * * * *